Patented Mar. 16, 1948

2,437,795

UNITED STATES PATENT OFFICE 2,437,795

PROCESSES OF MAKING ORGANIC PHOSPHINES

Cheves Walling, Montclair, N. J., assignor to E. I. du Pont de Nemours & Company, Wilmington, Del., a corporation of Delaware No Drawing. Application July 13, 1944, Serial No. 544,835

3 Claims. (Cl. 260—607)

This invention relates to processes for making organic phosphines.

Heretofore it has been proposed to make primary and secondary alkyl phosphines by heating a mixture of phosphonium iodide, zinc oxide and an alkyl iodide in a sealed tube. Dangerously high pressures are produced in this process. The products of the process are mixtures of phosphorus compounds and the process is therefore unsatisfactory, especially for commercial operations. Tertiary phosphines have been prepared by reacting a trihalide of phosphorus with a suitable Grignard reagent but this process employs a costly reagent. The process is difficult to control and in general it produces only compounds in which the organic radicals are alike. It is, therefore, desirable to provide processes for the manufacture of phosphines containing two or three organic radicals which are applicable under conditions consistent with practicable commercial operations.

The objects of the invention are attained in general by reacting in a suitable medium a metal salt of an organic phosphine with an inorganic halide. Accordingly an aliphatic, aralkyl or alicyclic ester of an inorganic acid such as an ester represented by the formula R—X, wherein R is an aliphatic, aralkyl or alicyclic organic radical and X is the inorganic acid radical is reacted with an equimolecular proportion of a mono-metallo phosphine having a formula PHR'Me or PR'R''Me, wherein Me represents an alkali metal, R' represents a monovalent organic radical and R'' represents a monovalent organic radical which may be like or different from R, all radicals being directly attached to the trivalent phosphorus. The products thus formed are represented by the formula PHR'R and PR'R''R. The reaction is carried out in a liquid medium which is inert, and in the presence of an atmosphere which is inert to the reactants and products.

The invention will be more fully set forth in the following more detailed description which includes examples that are given as illustrative embodiments of the invention and not as limitations thereof. Parts are expressed in parts by weight, unless otherwise noted.

The sodium salt of an organic phosphine may be made by reacting an organic phosphine and sodium in equimolecular proportions in an inert liquid solvent at a low temperature, such as liquid ammonia and —35° to —40° C. Any of the alkali metals can be used in similar manner to make other alkali metal salts of phosphines.

Example I

The sodium salt of n-butyl phosphine was formed by stirring for one hour a mixture composed of a little more than one mol (90 parts) of n-butyl phosphine and 1 mol (23 parts) of sodium dissolved in 500 parts of liquid ammonia at —35° to —40° C. The reaction was performed under an atmosphere of nitrogen. During this time the sodium salt of the phosphine ($C_4H_9PHNa$) was formed, as indicated by the evolution of hydrogen and the disappearance of the blue color characteristic of solutions of sodium in liquid ammonia.

One mol of n-butyl bromide was then added during about ½ hour with cooling to maintain a temperature of —35° C. to —45° C. The reaction was rapid. After the reaction was completed, 500 parts of water were added and an insoluble oily product separated. The product was dried over barium oxide and fractionated, yielding 50 parts (33%) of di-n-butyl phosphine, B. P. 180°–186° C. The entire operation was carried out under an atmosphere of nitrogen.

By using in the above procedure instead of n-butyl bromide an equivalent proportion of an aliphatic, aralkyl or alicyclic ester of any inorganic acid such as hydrochloric, hydroiodic, phosphoric or sulfuric acids, the corresponding phosphine having the general formula PHR'R is made. As illustrations of such aliphatic, aralkyl and alicyclic esters are mentioned methyl iodide, diethyl sulfate, propyl bromide, iso-amyl phosphate, octyl chloride, benzyl chloride, cyclohexyl iodide, allyl chloride and cyclohexenyl bromide.

Thus by using about one molecular proportion of the sodium salt of ethyl phosphine instead of the sodium salt of n-butyl phosphine and one molecular proportion of ethyl bromide instead of n-butyl bromide in the foregoing illustrative process, diethyl phosphine is produced. The latter product is represented by the formula $(C_2H_5)_2PH$.

Example II

A mixture of 40 parts of benzene, about one-tenth mol (9 parts) of n-butyl phosphine and four parts of metallic potassium were refluxed for 90 minutes under an atmosphere of nitrogen. During this time the potassium disappeared, and the benzene was filled with a flocculent precipitate of the potassium salt of n-butyl-phosphine.

The mixture was then cooled to room temperature and about one-tenth mol (16 parts) of ethyl iodide was added dropwise. The temperature rose almost to boiling, and the mixture was then heated and refluxed for 15 minutes.

The product was isolated from the reaction mixture by extraction with dilute hydrochloric acid. The extract was made alkaline with caustic soda and steam distilled. The oily distillate was fractionated, yielding about 50% of ethyl-n-butyl phosphine, B. P. 130°–135° C. The product is represented by the formula $(C_2H_5)(C_4H_9)PH$.

By variation of the phosphine and ester employed, any secondary phosphine of the general formula RR'PH where R is alkyl, aralkyl or alicyclic, and R' is alkyl, aralkyl, alicyclic or aryl may be prepared. For example, an equivalent proportion of any aliphatic, aralkyl or alicyclic ester of the formula R—X such as those mentioned in Example I may be employed instead of the ethyl iodide in Example II and reacted in accordance with Example II with an equimolecular equivalent of one of a wide variety of the alkali metal salts of primary phosphines of the formula R'PHMe such as methyl-, ethyl-, isopropyl-, sec. amyl-, octadecyl-, allyl-, benzyl-, beta-phenyl-ethyl-, alpha-tetrahydro-naphthyl-, cyclopentyl-, borneyl-, cyclohexyl-, phenyl-, p-tolyl-, and beta-naphthyl-phosphine. The phosphines thereby produced contain two organic radicals which are alike or different depending on the organic radicals of the starting compounds R—X and R'PHMe wherein X represents an inorganic acid radical and Me represents an alkali metal.

The alkali metal salt of an organic primary phosphine can be made by reacting in equimolecular proportions the alkali metal, such as sodium, potassium or lithium and the organic primary phosphine ($R'PH_2$) containing the desired organic R' radical in an inert solvent, such as ammonia or benzene; and stirring under an inert non-oxidizing atmosphere until the mono-alkali metal salt (R'PHNa) is formed.

*Example III*

The potassium salt or diethyl phosphine was made by adding 100 parts of diethyl phosphine to a suspension of potassium in toluene which consisted of 39 parts of potassium and 1000 parts of toluene. The mixture was refluxed under an atmosphere of nitrogen until the potassium was combined with the diethyl phosphine, yielding a flocculent precipitate.

Then 130 parts of benzyl chloride were slowly added to the mixture and the mixture was stirred for two hours under reflux. The potassium chloride was removed by filtration and the filtrate was fractionated under reduced pressure. The fraction boiling at 240°–260° C. at atmospheric pressure was a clear liquid consisting chiefly of diethyl benzyl phosphine which is represented by the formula $(C_2H_5)_2P(CH_2.C_6H_5)$.

Other tertiary phosphines having the general formula PRR'R'' are made by using the equivalent of an alkali metal salt of other secondary organic phosphines in the foregoing procedure instead of the potassium salt or diethyl phosphine, such as the alkali metal salt of ethyl butyl phosphine or any such secondary alkali metal salt wherein R' and R'' are alkyl, aralkyl, alicyclic or aryl in the phosphine represented by the general formula PR'R''H. Thus, by using an equivalent of the alkali metal salt of ethyl methyl phosphine, amyl cyclohexyl phosphine, allyl benzyl phosphine, propyl phenyl phosphine, di-para-tolyl phosphine or benzyl naphthyl phosphine instead of the potassium salt of diethyl phosphine used in the foregoing example, a large variety of products can be made. Still other products can be made by using equivalent proportions of other alkyl, aralkyl or alicyclic esters of inorganic acids instead of benzyl chloride in the foregoing example, such as the aliphatic, aralkyl and alicyclic esters mentioned in Example I.

The alkali metal salt of an organic secondary phosphine can be made by dissolving the desired alkali metal and the desired organic secondary phosphine (R'R''PH) in equimolecular proportions in an inert liquid solvent such as ammonia, hexane or benzene and stirring under an inert non-oxidizing atmosphere until the mono-alkali-metal salt (R'R''PMe) is formed.

In the foregoing formulae, R represents an aliphatic, aralkyl or alicyclic radical and R' and R'' each represents an aliphatic, aralkyl, alicyclic or aromatic radical. The organic radicals may be alike, R' and R'' may be alike or unlike each other and different from R, or all may be unlike radicals.

As illustrative of organic phosphines which may be prepared by this invention are mentioned methyl phenyl-, di-sec. butyl-, benzyl-ethyl-, octadecyl - phenyl - benzyl -, phenyl-cyclohexyl-, dicyclopentyl -, methyl - ethyl - propyl -, ethyl - butyl - benzyl -, methyl-propyl-cyclohexyl-, di-butyl-phenyl-, methyl-benzyl-cyclohexyl-, ethyl-benzyl-phenyl-, allyl-dibenzyl-, methyl - cyclopentyl-p-tolyl-, amyl-dicyclohexyl-, methyl-di-phenyl-, dibenzyl-phenyl- and diphenyl-cyclohexyl-phosphines.

It is evident that considerable variation can be made in the selection of suitable reactants. The salt of any alkali metal, such as the mono-sodium, -potassium, -lithium, -rubidium, or caesium salt of the desired organic phosphine can be used. Many different compounds can be used instead of those enumerated in the examples as the ester reactant. The acid radical of the ester may be an acid radical of an inorganic acid, such as the halogen acids, sulfuric, sulfurous, nitric, phosphoric, phosphorous and carbonic acid.

This invention provides new processes whereby a great variety of new phosphines can be made advantageously. In cases where the alkali metal salt of a given organic phosphine is difficult to make or gives poor yields and an organic phosphine is desired which contains that radical, the described process is advantageous in that such an organic radical can be introduced conveniently into an organic phosphine containing at least one replaceable hydrogen by selecting an appropriate conveniently prepared ester containing the desired radical. The reactants and reaction mixtures can generally be safely operated in apparatus which is at hand or is readily available. The new phosphines have a variety of useful purposes. In general, they are powerful reducing agents and many of them have a strong odor, whereby they are suitable for uses such as warning agents when mixed in small proportion with other gases or as reducing agents in chemical reactions. They can also be used as intermediates or starting compounds from which other compounds, such as phosphonium and phosphonic compounds, can be made. In general the compounds spontaneously oxidize in the air, sometimes with explosive violence. Accordingly, if the compounds are stored, it is desirable to provide means whereby they can be confined in an inert atmosphere, such as nitrogen.

Heretofore the processes provided for preparing organic phosphines containing two or three organic radicals only permitted of the preparation of compounds in which all of the organic radicals are alike. The present invention provides safe and convenient processes whereby new organic phosphines containing two or three organic radicals are present and one or more of the organic radicals is different from the others. These novel compounds are made possible for the first time by the processes herein set forth.

The preferred embodiments of the new processes are those which comprise the use of the esters of the halogen acids, such as the organic halides, bromides, chlorides and iodides, and the metals sodium and potassium.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises making a mixture of an alkali metal salt of an organic phosphine and an ester of an inorganic acid in an inert liquid medium, said phosphine compound being represented by the formula PR'R''Me, wherein R' is a member of the class consisting of alkyl radicals of 1 to 18 carbon atoms and allyl, benzyl, beta-phenylethyl, tetrahydro-naphthyl, cyclopentyl, borneyl, cyclohexyl, phenyl, tolyl and naphthyl radicals, wherein R'' is a member of the class consisting of hydrogen, alkyl radicals of 1 to 18 carbon atoms and allyl, benzyl, beta-phenylethyl, tetrahydronaphthyl, cyclopentyl, borneyl, cyclohexyl, phenyl, tolyl and naphthyl radicals, and wherein Me designates an alkali metal, said ester compound being represented by the formula RX wherein R is a member of the class consisting of alkyl radicals of 1 to 8 carbon atoms and benzyl, cyclohexyl, allyl and cyclohexenyl radicals, and wherein X is a member of the class consisting of acid radicals of halogen acids, sulfuric, sulfurous, nitric, phosphoric, phosphorous and carbonic acids, and retaining said compounds in admixture at reaction temperature until the metal is replaced by the radical R.

2. The process which comprises making a mixture of an alkali mono-metal salt of n-butyl-phosphine having the general formula $$(C_4H_9)PHMe$$

wherein Me is an alkali metal, an inorganic acid ester of n-butyl alcohol and liquid ammonia, and retaining said compounds in admixture at reaction temperature until di-n-butyl phosphine is formed.

3. The process which comprises making a mixture of an alkali metal salt of diethyl phosphine, a benzyl inorganic acid ester and toluene, and retaining said compounds in admixture at reaction temperature until di-ethyl benzyl phosphine is formed.

CHEVES WALLING.

REFERENCES CITED

The following references are of record in the file of this patent:

Beilstein, Handbuch der Organischen Chemie, 4th ed., vol. IV, pages 587–588.
Beilstein, Handbuch der Organischen Chemie, vol. XVI, page 770.
Richter, Organic Chemistry, Spielmann's translation, 2nd ed., pages 173–174.
Feiser, Organic Chemistry, 1944, page 32.

Certificate of Correction

Patent No. 2,437,795.

March 16, 1948.

CHEVES WALLING

It is hereby certified that errors appear in the printed specification of the above numbered patent requiring correction as follows: Column 1, line 53, for "and" read *at*; column 3, line 64, after the word "secondary" insert *phosphine*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.*